United States Patent [19]
Araki

[11] Patent Number: 4,870,935
[45] Date of Patent: Oct. 3, 1989

[54] SPARK IGNITION TIMING CONTROL SYSTEM FOR INTERNAL COMBUSTION ENGINE WITH ACCELERATION RESPONSIVE SPARK ADVANCE RETARDING CONTROL

[75] Inventor: Akihiko Araki, Gunma, Japan

[73] Assignee: Japan Electronic Control Systems Company, Limited, Isezaki, Japan

[21] Appl. No.: 218,266

[22] Filed: Jul. 13, 1988

[51] Int. Cl.$^4$ .............................................. F02P 5/15
[52] U.S. Cl. ..................................... 123/422; 123/417
[58] Field of Search ............... 123/416, 417, 418, 422, 123/423, 425, 492, 493

[56] References Cited

U.S. PATENT DOCUMENTS

| | | | |
|---|---|---|---|
| 3,935,845 | 2/1976 | Aono et al. | 123/422 |
| 4,423,714 | 1/1984 | Hayashi | 123/422 X |
| 4,445,479 | 5/1984 | Takakuwa et al. | 123/422 X |
| 4,448,163 | 5/1984 | Yoshida | 123/422 |
| 4,508,079 | 4/1985 | Komurasaki et al. | 123/422 X |
| 4,601,272 | 7/1986 | Nagai | 123/422 X |
| 4,697,563 | 10/1987 | Becker et al. | 123/422 X |
| 4,803,967 | 2/1989 | Ohkumo | 123/422 |

FOREIGN PATENT DOCUMENTS

| | | | |
|---|---|---|---|
| 0158374 | 9/1983 | Japan | 123/422 |
| 0211760 | 11/1984 | Japan | 123/422 |

Primary Examiner—Willis R. Wolfe
Attorney, Agent, or Firm—Foley & Lardner, Schwartz, Jeffery, Schwaab, Mack, Blumenthal & Evans

[57] ABSTRACT

A spark ignition control system distinguishes engine operating condition between low engine load range where acceleration shock tends to be created and high engine load range where acceleration shock to be created is small and better acceleration characteristics is required. The spark ignition timing control system performs spark advance retarding control while the engine is in the low engine load range and in response to acceleration demand. On the other hand, the spark advance retarding control is disabled in the high engine load range.

15 Claims, 4 Drawing Sheets

SPARK IGNITION TIMING CONTROL SYSTEM FOR INTERNAL COMBUSTION ENGINE WITH ACCELERATION RESPONSIVE SPARK ADVANCE RETARDING CONTROL

BACKGROUND OF THE INVENTION

1. Field of the Invention

The present invention relates generally to a spark ignition timing control system for an internal combustion engine. More specifically, the invention relates to a technique for suppressing or reducing uncomfortable shock upon engine acceleration, by controlling spark ignition timing.

2. Description of the Background Art

The recent automotive internal combustion engine have significantly improved acceleration characteristics by development of an electronic fuel injection control system which has substantially high response to engine acceleration demand. Therefore, engine revolution speed tends to rapidly increases output torque. This creates acceleration shock upon initiation of engine acceleration.

On the other hand, because of heavy weight of vehicular body, relatively great inertia moment is exerted on the vehicle body to lower response characteristics in vehicular acceleration. In relation to rapid engine acceleration, jerking tends to occur upon vehicular acceleration. Furthermore, during transition from engine acceleration state to steady state, uncomfortable pitching vibration occurs by causing longitudinal shift of the gravity center.

In order to suppress such uncomfortable vehicular jerking and pitching vibration, the co-pending U.S. patent application Ser. No. 170,360, filed on Mar. 18, 1988, still pending, and assigned to the common assignee to the present invention, proposes control of spark advance for suppressing too rapid engine speed variation for suppressing shock during engine acceleration and deceleration. For instance, upon engine acceleration, spark advance is retarded in a predetermined retarding angular magnitude for making increase of the engine output torque moderate enough to facilitate smooth acceleration.

In opposition to requirement for prevention of uncomfortable jerking and pitching vibration during acceleration, it is also important factor for providing better engine performance to provide good engine acceleration characteristics. Therefore, in spark ignition timing control, it becomes essential to balance prevention of vehicular jerking and/or pitching and satisfactory acceleration characteristics.

SUMMARY OF THE INVENTION

Therefore, it is an object of the present invention to provide a spark ignition timing control system which achieves high level balance in suppression of uncomfortable acceleration shock and pitching and in acceleration characteristics.

Another and more specific object of the invention is to provide a spark ignition timing control system which can perform spark advance control depending upon the engine operating condition for achieving good or high level balance between shock suppressive spark advance retarding control and spark advance control for better acceleration characteristics.

In order to accomplish the aforementioned and other objects, a spark ignition control system, according to the present invention, distinguishes engine operating condition between low engine load range where acceleration shock tends to be created and high engine load range where acceleration shock to be created is small and better acceleration characteristics is required. The spark ignition timing control system performs spark advance retarding control while the engine is in the low engine load range and in response to acceleration demand. On the other hand, the spark advance retarding control is disabled in the high engine load range.

According to one aspect of the invention, a spark ignition control system for an internal combustion engine, comprises an ignition system for performing spark ignition, a first sensor for monitoring preselected engine operation parameters including an engine load to produce a first sensor signal indicative thereof, a second sensor for monitoring magnitude of acceleration demand for producing a second sensor signal indicative thereof, and a controller deriving a basic spark advance on the basis of the first sensor signal, the controller being responsive to the second sensor signal for performing acceleration responsive advance correction in a first mode while the engine load is lower than a predetermined engine load criterion for retarding the basic spark advance for a first given magnitude and in a second mode while the engine load is higher than or equal to the engine load criterion for adjusting the basic spark advance with a second given retarding magnitude which is smaller than the first given magnitude.

According to another aspect of the invention, a spark ignition control system for an internal combustion engine, comprises an ignition system for performing spark ignition, a first sensor for monitoring preselected engine operation parameters including an engine load to produce a first sensor signal indicative thereof, a second sensor for monitoring magnitude of acceleration demand for producing a second sensor signal indicative thereof, and a controller deriving a basic spark advance on the basis of the first sensor signal, the controller being responsive to the second sensor signal for performing acceleration responsive advance correction while the engine load is lower than a predetermined engine load criterion for retarding the basic spark advance for a given magnitude, and the controller disables the acceleration responsive advance correction when the engine load is higher than or equal to the engine load criterion.

The controller derives variation rate of the engine load for varying the given magnitude based on the engine load variation rate. The controller also operates to maintain spark advance at a value retarded at the given magnitude for a first given period of time. The controller adjusts spark advance after expiration of the first period for a second given period. The controller adjusts the spark advance in a direction for suppressing engine speed variation within the second period.

According to a further aspect of the invention, a spark ignition control system for an internal combustion engine, comprises an ignition system for performing spark ignition, an engine speed sensor for monitoring engine revolution speed representative parameter for producing an engine speed indicative signal, an engine load sensor for monitoring an engine load representing parameter for producing an engine load indicative signal, an acceleration demand detector for monitoring engine load variation on the basis of the engine load indicative signal and producing an acceleration demand indicative signal when the engine load variation rate is greater than a predetermined acceleration criterion, a first means for deriving a basic spark advance on the basis of the engine speed indicative signal and the engine load indicative signal, a second means, responsive to the acceleration demand indicative signal, for retarding the spark advance for a given retarding magnitude, and a third means for detecting the engine load higher than or equal to a predetermined engine load criterion for disabling the second means.

The second means may derive the given retarding magnitude on the basis of the engine load variation rate. The second means maintains the spark advance constant at retarded value for a first period from detection of the acceleration demand. The second means further modifies the spark advance after expiration of the first period in a direction suppressing engine speed variation within a second period.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
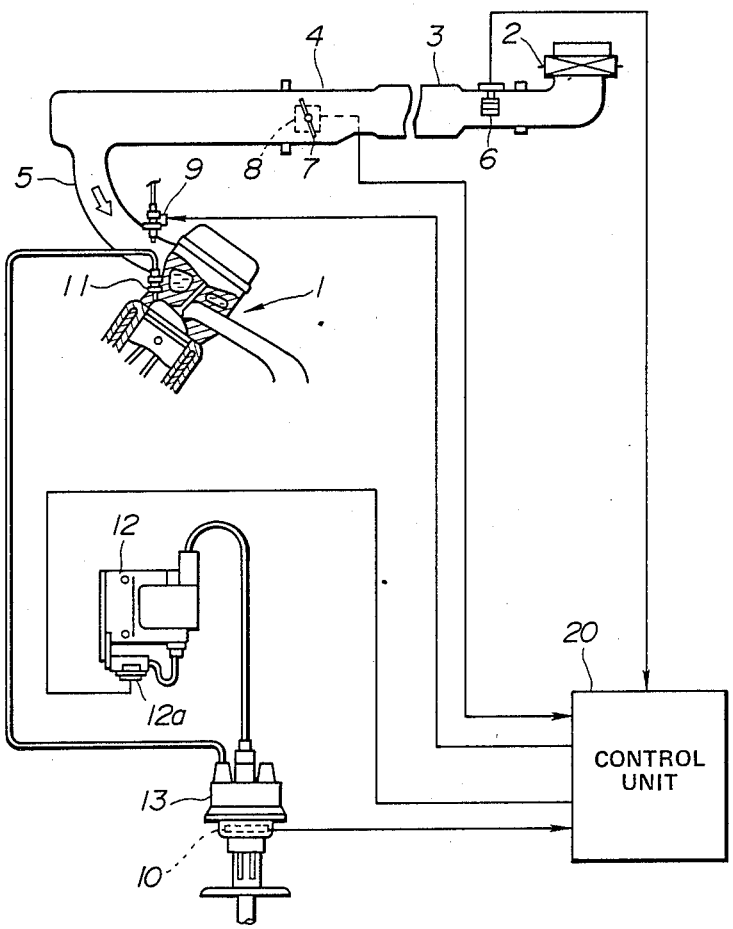
FIG. 1 is a diagramatical illustration of an internal combustion engine, to which the preferred embodiment of a spark ignition control system according to the present invention.

Referring now to the drawings, particularly to FIG. 1, the preferred embodiment of a spark ignition control system, according to the present invention, is applicable for an internal combustion engine 1. The engine 1 has one or more combustion chamber connected to an induction system including an air cleaner 2, an induction duct 3, a throttle chamber 4 and an intake manifold 5.

An air flow meter 6 is disposed within the induction duct 3 for monitoring intake air flow rate Q flowing through the air induction system and produces an intake air flow rate indicative signal $S_Q$. The intake air flow rate Q as measured by the air flow meter 6 serves as an engine load representative data.

A throttle valve is disposed in the throttle chamber 4. The throttle valve is connected to an accelerator pedal (not shown) to be controlled the angular position by adjusting depression magnitude of the accelerator pedal. A throttle angle sensor 7 is associated with the throttle valve for monitoring throttle valve angular position TVO to produce a throttle angle indicative signal $S_{TVO}$. An idling switch 8 which is designed to detect fully closed position or substantially fully closed position of the throttle valve, is associated. The idling switch 8 produces the throttle valve open angle smaller than a predetermined criterion representing the throttle valve substantially closed position, to produce an idling switch signal $S_{IDL}$.

A crank angle sensor 10 is associated with a distributor 13 for monitoring a crankshaft angular position. The crank angle sensor 10 produces a crank reference signal $\theta_{ref}$ at each predetermined crankshaft angular position and a crank position signal $\theta_{pos}$ at each predetermined angular displacement of the crankshaft. As is well known, the predetermined crankshaft angular positions, at which the crank reference signal $\theta_{ref}$ are produced, are determined in relation to induction stroke top-dead-center (TDC) of each engine cylinder, e.g. 70° before TDC (BTDC). Therefore, the crank reference signals $\theta_{ref}$ are produced every 120° in case of 6-cylinder engine and 180° in case of 4-cylinder engine. On the other hand, the crank position signal $\theta_{pos}$ is produced every 1° of crank shaft angular displacement.

As is well known, a data indicative of an engine revolution speed N is derived on the basis of the crank reference signal $\theta_{ref}$ or the crank position signal $\theta_{pos}$. In case that the crank reference signal $\theta_{ref}$ is used for deriving the engine speed data, an interval of the crank reference signals is measured to obtain the engine speed data by deriving reciprocal of the measured interval. On the other hand, when the crank position signal $\theta_{pos}$ is used for deriving the engine speed data N, the crank position signal is counted over a predetermined period or a period for occurring a given number of crank position signals is measured for deriving the engine speed data based thereon.

The distributor 13 is connected to an ignition coil 12 which incorporates a power transistor 12a. The power transistor 12a is connected to the control unit 20 to be triggered at a controlled timing by the spark ignition control signal for initiating spark ignition at a controlled timing. The distributor 13 distributes ignition power to spark plugs 11 inserted into the engine cylinders for spark ignition in the combustion chambers.

One or more fuel injection valves 9 are disposed within the intake manifold 5. These fuel injection valves 9 are connected to a fuel injection system including a pressurized fuel source. The fuel injection valves 9 are controlled open timing and open period for performing fuel injection at controlled timing and for a controlled amount, by a fuel injection control system. As is well known, the fuel injection control system includes a control unit 20 which comprises a microprocessor. The control unit 20 performs fuel injection control based on preselected engine operation parameters. As basic fuel injection control parameters, the intake air flow rate data Q and the engine speed data N are used. As is well known, based on the intake air flow rate Q and the engine speed data Q, a basic fuel injection amount Tp is derived according to the following well known equation:

$$Tp = K \times Q/N$$

(K: constant)

The basic fuel injection amount is corrected to derived the actual amount Ti of the fuel to be injected on the basis of preselected fuel injection correction parameters according to the following known equation:

$$Ti = Tp \times COEF + Ts$$

where
COEF is correction coefficient including acceleration enrichment component, engine coolant temperature dependent component, engine start-up enrichment coefficient and so forth; and Ts is battery voltage compensating value.

The control unit 20 generates a fuel injection pulse having the pulse width corresponding to the derived fuel injection amount Ti and outputs the fuel injection pulse at a controlled timing derived in relation to the crankshaft angular position.

Since the process of fuel injection control is not the essential feature of the present invention, no further detailed disclosure will be given. However, it should be clearly appreciated that the spark ignition control system according to the present invention is applicable for the internal combustion engines associated with any types of fuel injection control systems.

The control unit 20 also performs spark ignition control. In the shown embodiment, the control unit 20 takes the engine speed data N and the Tp value representative of the basic fuel injection amount and derived on the basis of the engine speed data N and the intake air flow rate Q, are taken as basic parameter for spark ignition control. Furthermore, the throttle angle indicative signal $S_{TVO}$ is take as parameter representing engine load variation indicative parameter. For instance, the engine acceleration demand is detected on the basis of increasing of the throttle valve angular position.

Figure 2:
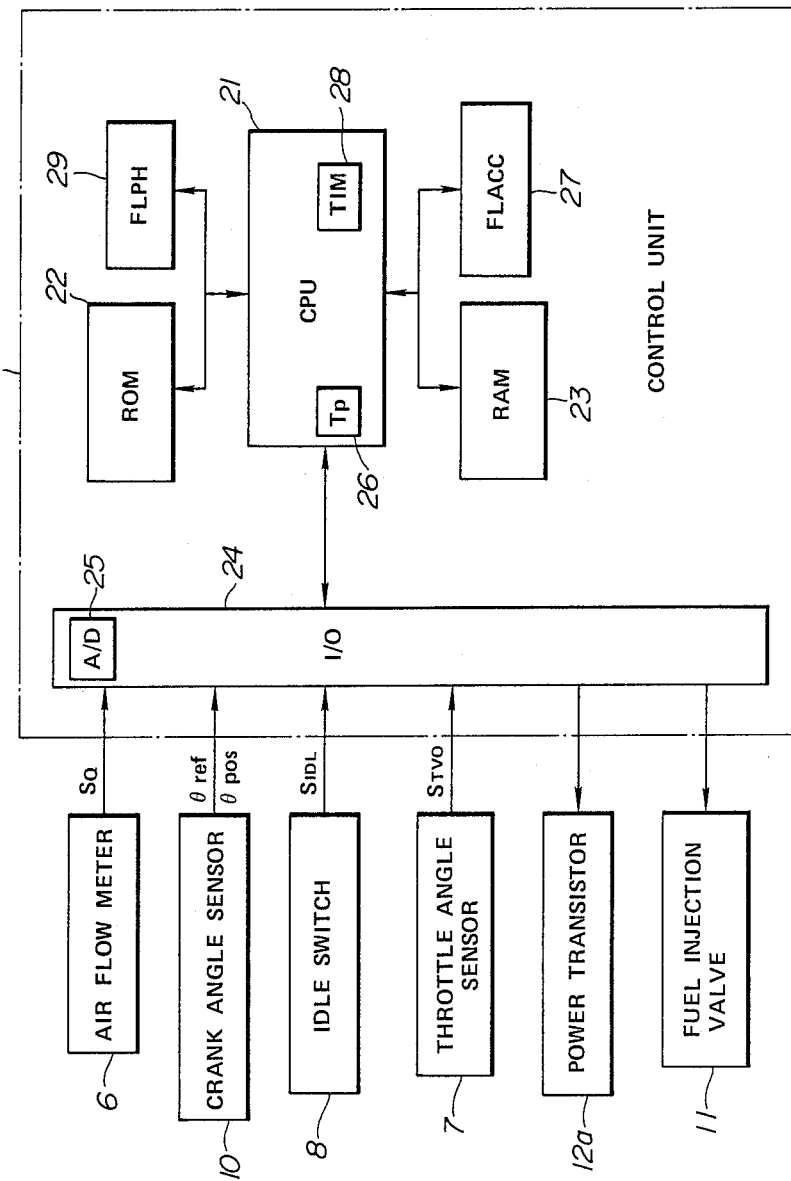
FIG. 2 is a block diagram of the preferred embodiment of the spark advance control system of the invention.

As shown in FIG. 2, the control unit 20 generally includes CPU 21, ROM 22, RAM 23 and input/output interface 24. The interface 24 may include an analog-to-digital (A/D) converter 25 for converting the analog form signal, such as the intake air flow rate indicative signal $S_Q$ into digital signal. The control unit 20 performs various routines in time sharing basis as governed by a main program which is performed as background job. The routines to be performed by the control unit 20 includes a routine for deriving throttle valve angular variation data TVODIF between execution cycle. This throttle valve angular variation data TVODIF is derived by comparing the throttle angular position indicative signal value $TVO_{old}$ sampled in the immediately preceding execution cycle of the routine and the throttle valve angular position indicative data $TVO_{new}$ sampled in current execution cycle and whereby obtain the difference therebetween. Similarly, the engine speed variation data NDIF is derived by another routine by comparing the engine speed data $N_{old}$ sampled in the immediately preceding execution cycle and the engine speed data $N_{new}$ sampled in the current execution cycle. These TVODIF and NDIF deriving routines are triggered at given intervals. Furthermore, CPU 21 of the control unit 20 includes Tp register 26 designed for storing Tp value data. The Tp register 26 is triggered while the fuel injection amount derivation routine, to store the $Tp_{old}$ data derived in the immediately preceding fuel injection amount derivation routine and $Tp_{new}$ derived in the current fuel injection amount derivation routine.

Figure 3:
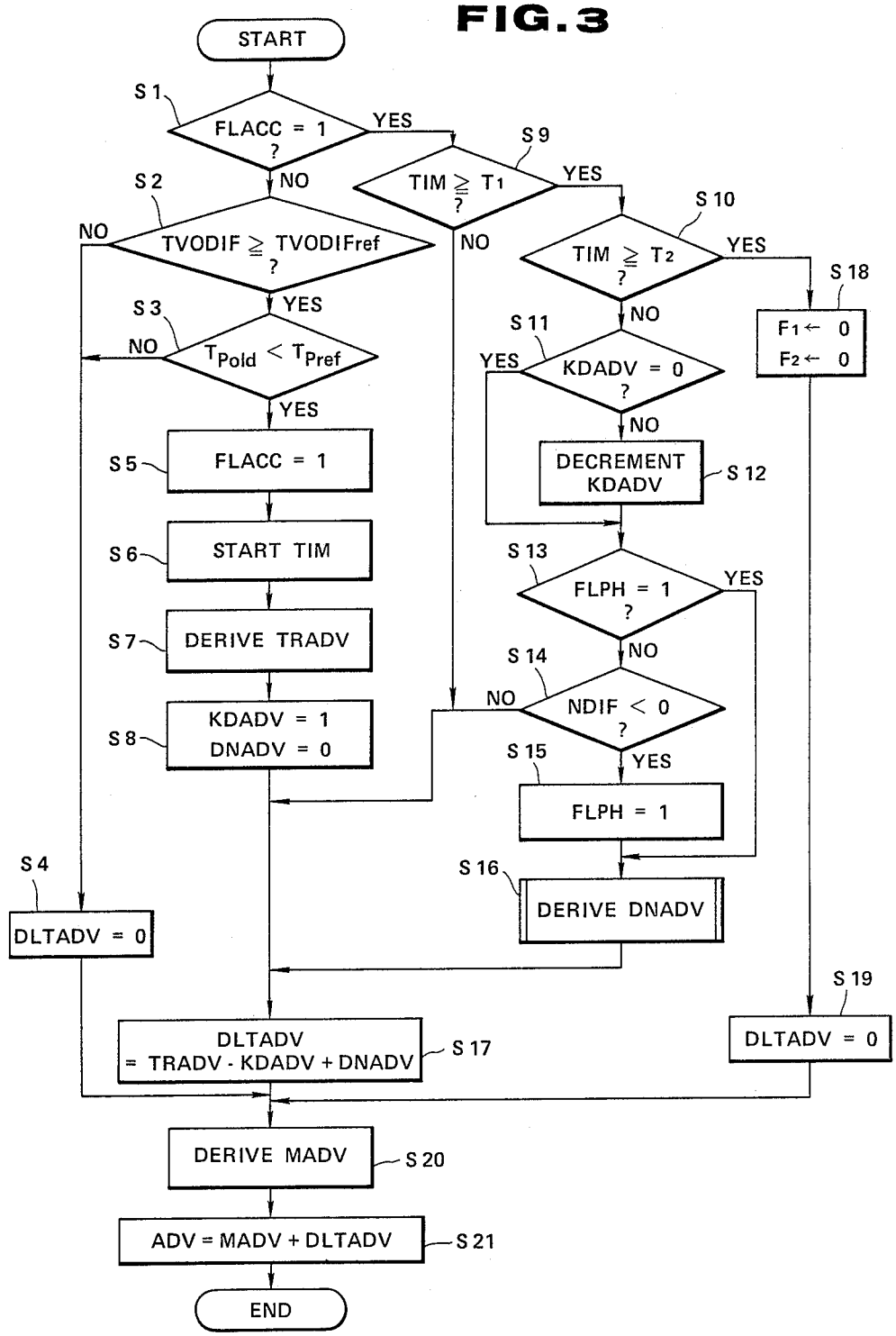
FIG. 3 is a flowchart of a spark advance control program for performing acceleration demand responsive spark advance retarding control.

FIG. 3 is a flowchart of the spark ignition timing deriving routine which is triggered every given timing. Immediately after starting execution, an acceleration state indicative flag FLACC which is set in a flag register 27 in the control unit 20, at a step S1. When the acceleration state indicative flag FLACC is not set as checked at the step S1, the throttle angle variation data TVODIF is compared with a preset throttle angle variation threshold $TVODIG_{ref}$, at a step S2. When the throttle angle variation data TVODIF is greater than or equal to the throttle angle variation threshold $TVODIF_{ref}$ as checked at the step S2, the $Tp_{old}$ value is read from the Tp register 27 and compared with an engine load threshold $Tp_{ref}$, at a step S3. The engine load threshold $Tp_{ref}$ represents the engine load criterion distinguishing the low engine load range and the high engine load range. As set forth, in the high engine load range, magnitude of shock to be created by rapid engine acceleration is small enough so as not to affect for riding comfort and engine drivability and better acceleration in response to acceleration demand is required. On the other hand, in low engine load condition, rapid acceleration of the engine will cause vehicular jerking and/or pitching at unacceptable level.

When the throttle angle variation data TVODIF is smaller than the throttle angle variation threshold $TVODIF_{ref}$ or when the $Tp_{old}$ value is greater than or equal to the engine load threshold $Tp_{ref}$, an acceleration state spark advance correction value DLTADV is set at zero (0), at a step S4.

On the other hand, when the $Tp_{old}$ value is smaller than the engine load threshold $Tp_{ref}$ as checked at the step S3, the acceleration state indicative flag FLACC is set at a step S5. Thereafter, a timer 28 is triggered at a step S6 for measuring elapsed time.

At a step S7 following the step S6, a spark advance retarding magnitude TRADV is derived on the basis of the throttle angle variation data TVODIF. In practice, a spark advance retard angle table is set in ROM 22, which table is looped up in terms of the throttle angle variation data TVODIF. Subsequently, a time dependent correction coefficient KDADV is set to one (1) and phase dependent control value DNADV is set to zero (0), at a step S8.

After step S8, acceleration state correction coefficient DLTADV is calculated at a step S17. In practice, the acceleration correction coefficient DLTADV is derived by the following equation:

$$DLTADV = TRADV \times KDADV + DNADV$$

After setting the acceleration state correction coefficient DLTADV to zero at the step S4 or after deriving the acceleration state correction coefficient DLTADV, basic spark advance MADV is derived on the basis of the engine speed data N and the Tp value, at a step S20. In practice, basic spark advance MADV is derived by table look-up in terms of the engine speed N and the Tp value, utilizing known three-dimensional spark advance table. Then, spark advance ADV is calculated at a step S21. In case that the acceleration state correction coefficient DLTADV is set to zero at the step S4, the spark advance ADV to be derived at the step S21 becomes equal to the basic spark advance MADV derived at the step S20. On the other hand, when the acceleration state correction coefficient DLTADV derived at the step S17 is used for deriving spark advance ADV, since the time dependent correction coefficient KDADV is set to 1 and the phase control value DNADV is set to zero, the acceleration state correction coefficient DLTADV becomes equal to the spark advance retarding magnitude TRADV derived at the step S7. Therefore, the spark advance ADV becomes:

$$ADV = MADV + TRADV$$

Figure 5:
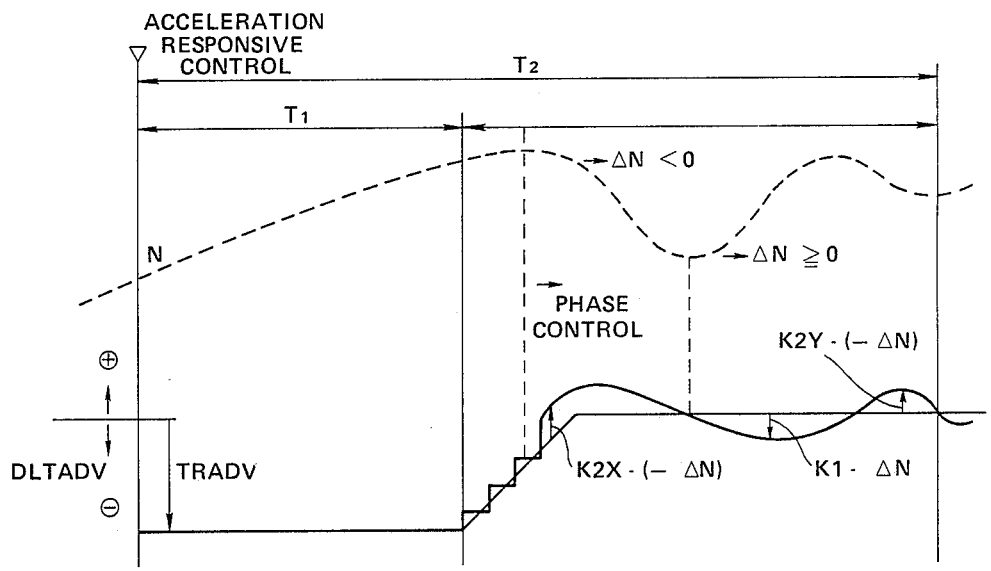
FIG. 5 is a timing chart showing operation of the preferred embodiment of a spark ignition timing control system.

On the other hand, when the acceleration state indicative flag FLACC is set as checked at the step S1. The timer value TIM of the timer 28 is compared with a first time threshold $T_1$ which defines a period to maintain spark advance ADV at retarded condition, at a step S9, as shown in FIG. 5. When the timer value TIM is smaller than the first timer threshold $T_1$, process jumps to the step S17 to derive the acceleration state correction coefficient DLTADV and subsequently derive the spark advance ADV. On the other hand, when the timer value TIM is greater than or equal to the first timer threshold $T_1$, the timer value TIM is compared with a second timer threshold $T_2$ which is longer than the first timer threshold and defines a predetermined overall period to perform acceleration demand responsive spark advance control, at a step S10. When the timer value TIM is smaller than the second timer threshold $T_2$ as checked at the step S10, the time dependent correction coefficient KDADV is checked whether it is zero (0) or not, at a step S11. When the time dependent correction coefficient KDADV is greater than zero as checked at the step S11, the time dependent correction coefficient KDADV is decremented by a given value so that retarding magnitude is gradually decreased toward zero, at a step S12. On the other hand, when the time dependent correction coefficient KDADV as checked at the step S11 is zero, the process jumps the step S12.

AFter the step S12 or when time dependent correction coefficient KDADV is zero as checked at the step S11, a phase control state flag FLPH which is set in a flag register 29 of the control unit 20, is checked at a step S13. When the phase control state flag FLPH is not set as checked at the step S13, the engine speed variation data NDIF is read out and is compared with zero, at a step S14. When the engine speed variation data NDIF is greater than or equal to zero as checked at the step S14, process goes to the step S17.

Figure 4:
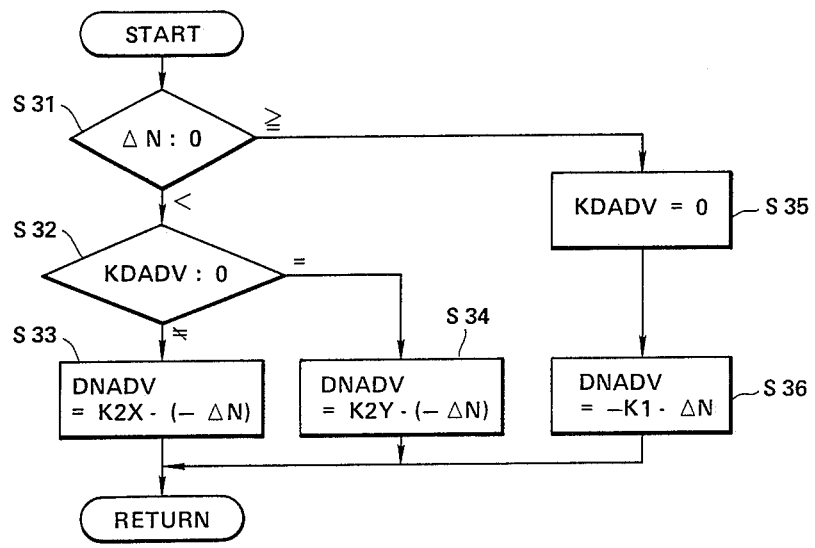
FIG. 4 is a flowchart of a acceleration and deceleration responsive correction value deriving routine.

On the other hand, when the engine speed variation data NDIF is smaller than zero which means that the engine is decelerated, the phase control state flag FLPH is set at a step S15. After the step S15 or when the phase control state flag FLPH is set as checked at the step S13, phase control sub-routine which is shown in FIG. 4 is triggered at a step S16, the process of which sub-routine will be discussed later. After process in the sub-routine, process goes to the step S17.

When the timer value TIM becomes greater than or equal to the second timer threshold $T_2$ as checked at the step S10, both of the acceleration state indicative flag FLACC and the phase control state flag FLPH are reset at a step S18. Then, the acceleration state correction coefficient DLTADV is set at zero at a step S19.

The phase control sub-routine of FIG. 4 is triggered at the step S16 of the spark advance control routine of FIG. 3. In execution of the shown sub-routine, at first, the engine speed variation data NDIF is read and compared with zero at a step S31 for distinguishing the engine acceleration state and engine deceleration state. When engine deceleration, i.e. the engine speed variation data NDIF smaller than zero, is detected as checked at the step S31, the time dependent correction coefficient KDADV is checked whether it is equal to zero, at a step S32. When the time dependent correction coefficient KDADV is not equal to zero as checked at the step S32, the phase control value DNADV is calculated at a step S33 by:

$$DNADV = K_2X \times (-NDIF)$$

($K_2X$: constant)
On the other hand, when the time dependent correction coefficient KDADV is equal to zero as checked at the step S32, the phase control value DNADV is calculated at a step S34 by:

$$DNADV = K_2Y \times (-NDIF)$$

($K_2Y$: constant)
When the engine speed variation data NDIF is greater than or equal to zero as checked at the step S31, the time dependent correction coefficient KDADV is set at zero at a step S35. Thereafter, the phase control value DNADV is calculated at a step S36 by:

$$DNADV = -K_1 \times NDIF$$

($K_1$: constant)
Through the steps S31 to S36, the spark advance is advanced by positive value of the phase control value DNADV during engine deceleration state and is retarded by negative value of phase control value during engine acceleration state.

After one of the step S33, S34 and S36, process returns to the routine of FIG. 3.

As will be appreciated herefrom, in the shown embodiment, since retarding control will not occur during engine acceleration in high engine load range in which acceleration shock is satisfactorily small and acceleration response characteristics is important, good acceleration characteristics can be obtained. On the other hand, since engine is prevented from rapid acceleration, acceleration shock can be satisfactorily suppressed.

It should be appreciated, though the shown embodiment disables spark advance retarding control while the engine is in high load range, it may be possible to reduce retarding magnitude in high engine load range.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:
1. A spark ignition control system for an internal combustion engine, comprising:
an ignition system for performing spark ignition;
a first sensor for monitoring preselected engine operation parameters including an engine load to produce a first sensor signal indicative thereof;
a second sensor for monitoring magnitude of acceleration demand for producing a second sensor signal indicative thereof; and
a controller deriving a basic spark advance on the basis of said first sensor signal, said controller being responsive to said second sensor signal for performing acceleration responsive advance correction in a first mode while said engine load is lower than a predetermined engine load criterion for retarding said basic spark advance for a first given magnitude and in a second mode while said engine load is higher than or equal to said engine load criterion for adjusting said basic spark advance with a second given retarding magnitude which is smaller than said first given magnitude.

2. A spark ignition control system as set forth in claim 1, wherein said controller derives variation rate of said engine load for adjusting said first given magnitude based thereon.

3. A spark ignition control system as set forth in claim 1, wherein said control operates in said first mode to maintain spark advance at a value retarded at said first given magnitude for a first given period of time.

4. A spark ignition control system as set forth in claim 3, wherein said controller adjusts spark advance after expiration of said first period for a second given period.

5. A spark ignition control system as set forth in claim 1, wherein said said controller sets said second given retarding magnitude to zero.

6. A spark ignition control system as set forth in claim 4, wherein said controller adjusts said spark advance in a direction for suppressing engine speed variation within said second period.

7. A spark ignition control system for an internal combustion engine, comprising:
   an ignition system for performing spark ignition;
   a first sensor for monitoring preselected engine operation parameters including an engine load to produce a first sensor signal indicative thereof;
   a second sensor for monitoring magnitude of acceleration demand for producing a second sensor signal indicative thereof; and
   a controller deriving a basic spark advance on the basis of said first sensor signal, said controller being responsive to said second sensor signal for performing acceleration responsive advance correction while said engine load is lower than a predetermined engine load criterion for retarding said basic spark advance for a given magnitude, and said controller disables said acceleration responsive advance correction when said engine load is higher than or equal to said engine load criterion.

8. A spark ignition control system as set forth in claim 7, wherein said controller derives variation rate of said engine load for varying said given magnitude based on said engine load variation rate.

9. A spark ignition control system as set forth in claim 7, wherein said control operates to maintain spark advance at a value retarded at said given magnitude for a first given period of time.

10. A spark ignition control system as set forth in claim 9, wherein said controller adjusts spark advance after expiration of said first period for a second given period.

11. A spark ignition control system as set forth in claim 10, wherein said controller adjusts said spark advance in a direction for suppressing engine speed variation within said second period.

12. A spark ignition control system for an internal combustion engine, comprising:
   an ignition system for performing spark ignition;
   an engine speed sensor for monitoring engine revolution speed representative parameter for producing an engine speed indicative signal;
   an engine load sensor for monitoring an engine load representing parameter for producing an engine load indicative signal;
   an acceleration demand detector for monitoring engine load variation on the basis of said engine load indicative signal and producing an acceleration demand indicative signal when said engine load variation rate is greater than a predetermined acceleration criterion;
   a first means for deriving a basic spark advance on the basis of said engine speed indicative signal and said engine load indicative signal;
   a second means, responsive to said acceleration demand indicative signal, for retarding said spark advance for a given retarding magnitude; and
   a third means for detecting said engine load higher than or equal to a predetermined engine load criterion for disabling said second means.

13. A spark ignition control system as set forth in claim 12, wherein said second means derives said given retarding magnitude on the basis of said engine load variation rate.

14. A spark ignition control system as set forth in claim 13, wherein said second means maintains said spark advance constant at retarded value for a first period from detection of said acceleration demand.

15. A spark ignition control system as set forth in claim 14, wherein said second means further modifies said spark advance after expiration of said first period in a direction suppressing engine speed variation within a second period.

* * * * *